United States Patent
Pokkinen et al.

(10) Patent No.: US 11,038,457 B2
(45) Date of Patent: Jun. 15, 2021

(54) MOTOR DRIVE

(71) Applicant: KONE Corporation, Helsinki (FI)

(72) Inventors: Olli Pokkinen, Helsinki (FI); Arto Nakari, Helsinki (FI)

(73) Assignee: KONE CORPORATION, Helsinki (FI)

( * ) Notice: Subject to any disclaimer, the term of this patent is extended or adjusted under 35 U.S.C. 154(b) by 139 days.

(21) Appl. No.: 16/460,707

(22) Filed: Jul. 2, 2019

(65) Prior Publication Data

US 2019/0326845 A1 Oct. 24, 2019

Related U.S. Application Data

(63) Continuation of application No. PCT/EP2017/055830, filed on Mar. 13, 2017.

(51) Int. Cl.
*H02P 29/024* (2016.01)
*H02P 27/06* (2006.01)
(Continued)

(52) U.S. Cl.
CPC .......... *H02P 29/027* (2013.01); *H02H 3/165* (2013.01); *H02H 7/0838* (2013.01);
(Continued)

(58) Field of Classification Search
CPC ....... H02P 29/027; H02P 27/06; H02H 3/165; H02H 7/0838; H02H 7/1227; H02M 7/5387
(Continued)

(56) References Cited

U.S. PATENT DOCUMENTS 5,467,242 A 11/1995 Kiraly
6,381,110 B1 4/2002 Nagashima et al.
(Continued)

FOREIGN PATENT DOCUMENTS

DE 198 05 499 A1 8/1999

OTHER PUBLICATIONS

International Search Report (PCT/ISA/210) issued in PCT/EP2017/055830, dated Dec. 15, 2017.
(Continued)

*Primary Examiner* — Jorge L Carrasquillo
(74) *Attorney, Agent, or Firm* — Birch, Stewart, Kolasch & Birch, LLP

(57) ABSTRACT

A motor drive includes a rectifier bridge, which rectifier bridge is connected to an DC link, which is connected to an inverter bridge having phase outputs configured to be connected to an elevator motor, as well as a drive control controlling the semiconductor switches of the inverter bridge. The inverter bridge has upper semiconductor switches of the upper side connected to plus of the DC link and lower semiconductor switches of the lower side connected to minus of the DC link, the upper semiconductor switches are semiconductor switches without desaturation- and/or over-current protection whereas the lower semiconductor switches comprise a desaturation- and/or over-current protection, or vice versa. The drive control includes an earth fault control circuit which is configured to establish an earth fault test, in which each single semiconductor switch comprising a desaturation- and/or over-current protection is switched through, only one at a time, over a test time period, whereby the earth fault control circuit is configured to enable start of the motor drive only if the earth fault test has not lead to a tripping of the desaturation- and/or over-current protection of one of the semiconductor switches.

19 Claims, 3 Drawing Sheets

Figure 1:
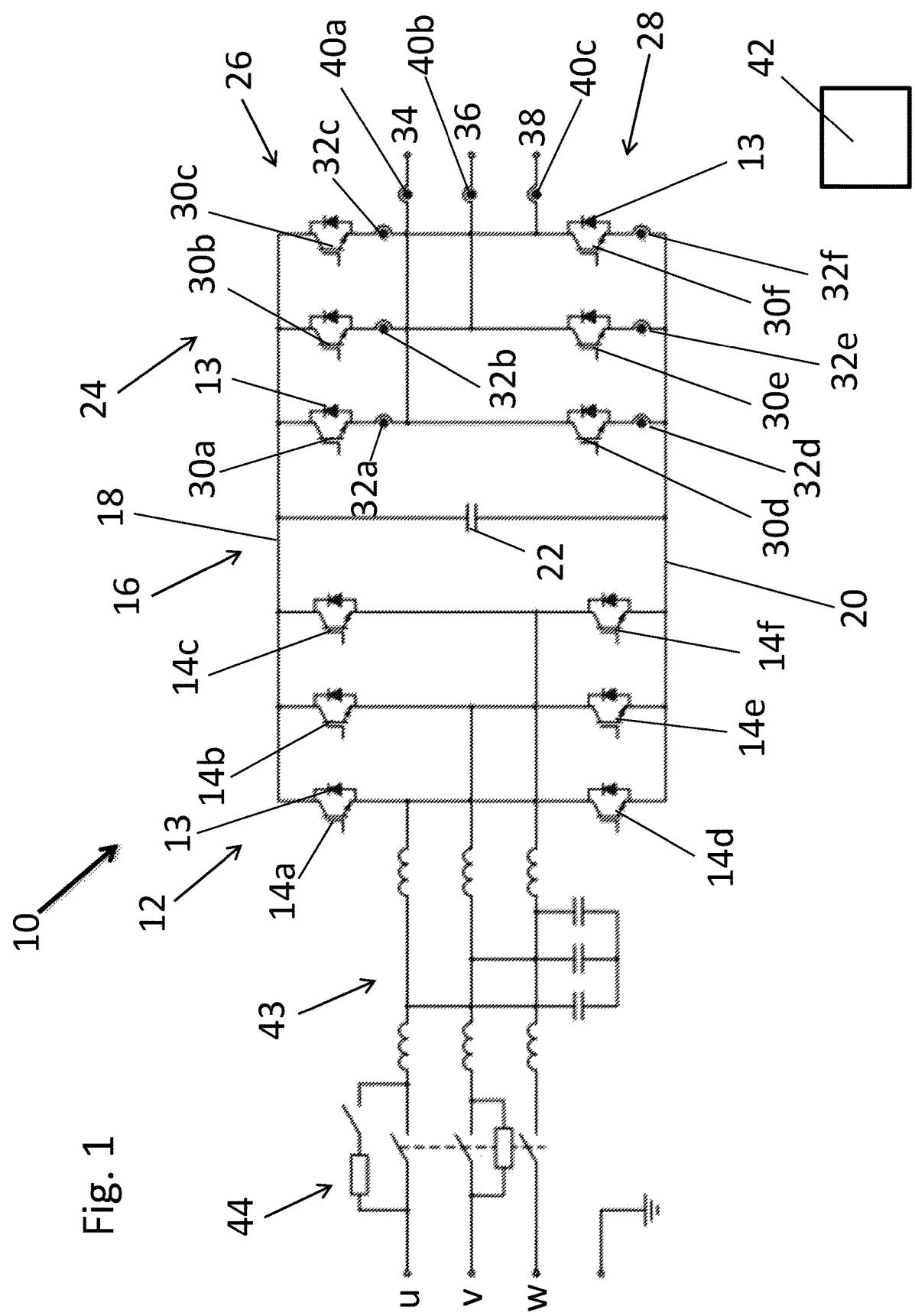

(51) Int. Cl.
*H02M 7/5387* (2007.01)
*H02H 3/06* (2006.01)
*H02H 7/08* (2006.01)
*H02H 7/122* (2006.01)
*H02H 3/16* (2006.01)

(52) U.S. Cl.
CPC ........ *H02H 7/1227* (2013.01); *H02M 7/5387* (2013.01); *H02P 27/06* (2013.01)

(58) Field of Classification Search
USPC ...................................... 318/400.22, 400.21
See application file for complete search history.

(56) References Cited

U.S. PATENT DOCUMENTS

| | | | |
|---|---|---|---|
| 8,970,235 B2 | 3/2015 | Yoshida | |
| 9,296,589 B2 | 3/2016 | Marvin | |
| 2011/0249368 A1 | 10/2011 | Andersen | |
| 2012/0280644 A1* | 11/2012 | Lind | H02P 29/0241 |
| | | | 318/476 |
| 2014/0218826 A1* | 8/2014 | Majarov | H02M 1/32 |
| | | | 361/18 |
| 2014/0347067 A1 | 11/2014 | Hirono | |
| 2015/0210506 A1 | 7/2015 | Kattainen et al. | |
| 2016/0134101 A1* | 5/2016 | Kalina | H02H 3/165 |
| | | | 361/47 |
| 2018/0090925 A1* | 3/2018 | Raassina | B66B 1/30 |

OTHER PUBLICATIONS

Written Opinion of the International Searching Authority (PCT/ISA/237) issued in PCT/EP2017/055830, dated Dec. 15, 2017.

* cited by examiner

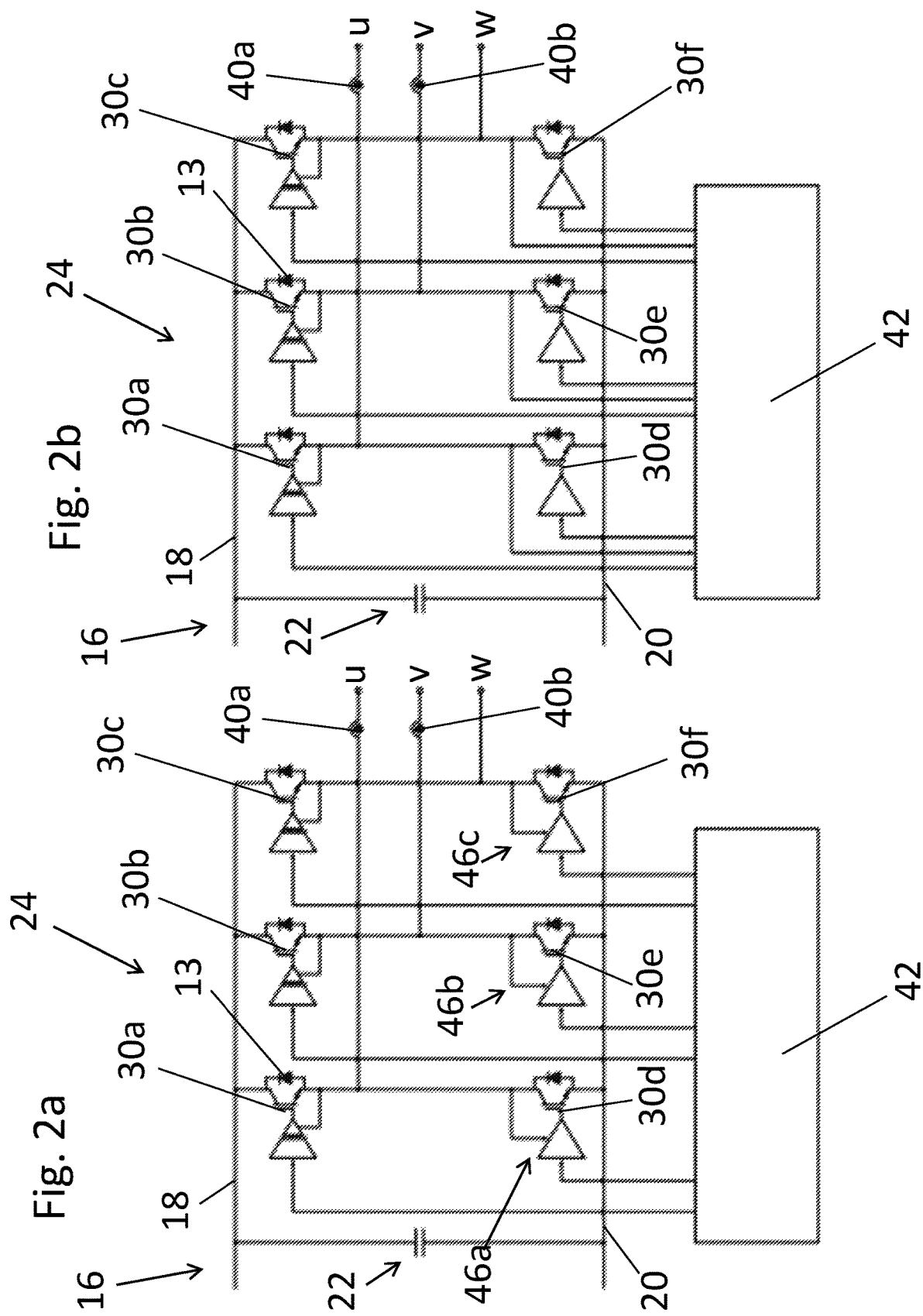

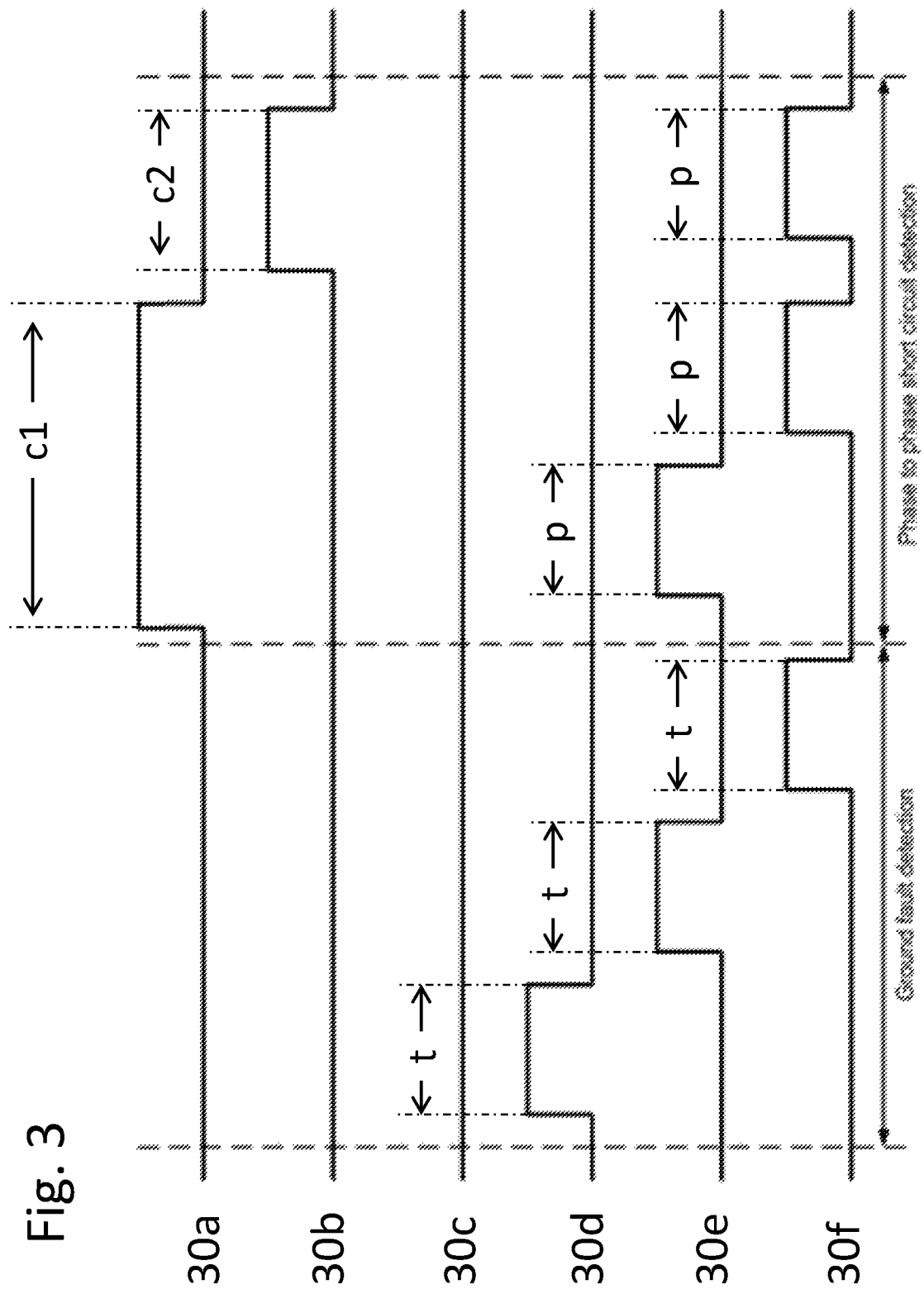

MOTOR DRIVE

CROSS REFERENCE TO RELATED APPLICATIONS

This application is a Continuation of PCT International Application No. PCT/EP2017/055830, filed on Mar. 13, 2017, which is hereby expressly incorporated by reference into the present application.

In motor drives or frequency converters for passenger conveyors as e.g. elevators, escalators, moving ramps or moving side walks the provision of an motor earth fault protection is highly desirable. A motor earth fault means that one or more motor windings or its inputs are connected to ground. Such an earth fault should be detected to prevent excessive currents flowing and breaking any components, particularly the semiconductor switches of the inverter bridge. There is only a small chance that earth or ground fault would happen during the operation of the inverter, but most likely it happens during installation when the power is cut. Therefore, in most cases it would be sufficient to detect the ground fault situation when during the start of the frequency converter the mains supply is connected and then to prevent the flow of ground fault current by using some switching elements.

Motor output earth fault and also phase-to-phase short circuits between motor windings or inputs can cause excessive current flow through the semiconductors of the inverter bridge and lead to permanent damage of the semiconductor switches. Therefore, a means to detect and interrupt current caused by earth fault or phase-to phase short circuit would be preferable.

There are several different ways to provide an earth fault—and phase-to-phase short circuit protection for inverter motor output. Basically, the known method is to somehow measure the current in the inverter bridge and interrupt it when it exceeds a predefined value. Interruption of current is usually done by controlling the switching elements of the inverter bridge to off state. These semiconductor switches are usually semiconductor switches, e.g. IGBTs, silicon MOSFETs, silicon carbide MOSFETs or equivalent.

The current measurement can be done from several places in the motor drive, e.g. at the phase outputs and/or in series with each semiconductor switch of the inverter bridge.

Current measurement directly from output phases is advantageous because that information can be used also for motor current control purposes in addition to switch over current protection. The current measurement device can be, for example, a hall current sensor which provides also electrical isolation between the line to be measured and the measurement circuit.

Also, a shunt resistor can be used for current measurement but this solution needs additional circuitry to provide electrical isolation between phase outputs and controller.

Isolation can be done, for example, by isolation amplifier based on opto-coupler or some other isolation technique. All current measurement techniques that need electrical isolation tend to be slower in response time and have smaller bandwidth than solutions which do not need isolation. Slower response means that those techniques cannot necessarily be used to protect semiconductor switches from overcurrent events.

Semiconductor chip sizes are getting smaller and smaller over the time as manufacturers tend to increase their current density and thus reduce cost. However, a downside is that their short circuit current rating decreases accordingly. It means that short circuit current must be interrupted very fast, in few milliseconds. Otherwise the switch will be destroyed. So when using a hall effect current sensor (or other slow technique) to provide current information to a drive control, an additional measure to provide fast over current protection has to be realized as well. This can be done with gate drivers that have a desaturation protection or over current comparator for shunt measurement. Desaturation protection means that the gate driver itself is able to detect over current event by sensing collector to emitter voltage and interrupt the current. Interruption of current is advantageous to do so that gate emitter voltage is slowly ramped down so that the IGBT turns off "softly" in order to avoid high voltage spikes between collector and emitter caused by high di/dt and leakage inductance in the circuit. This kind of gate drivers that have desaturation protection and soft turn off function are costly. Also, upper side drivers have to have an electrical isolation. If the motor drive is referenced to DC-link then lower side drivers do not have to have an isolation. If the motor drive is referenced to ground, then both high and lower side drivers have to be isolated.

A solution for an earth fault protection is disclosed in U.S. Pat. No. 9,296,589. However, in this known solution it is not possible to detect ground fault current that is flowing from the drive input through an active line bridge upper semiconductor switch and through an upper semiconductor switch of the inverter bridge to output and ground.

The object of the present invention is to provide an motor drive which is able to detect a wider variety of earth faults at the motor side of the motor drive with little hardware effort.

The above-mentioned object is solved with an motor drive. The object is further solved with a method of using the motor drive. Preferred embodiments of the invention are subject-matter of the dependent claims. Preferred embodiments of the invention are also described in the descriptive part as well as in the figures.

According to the invention, the motor drive comprises a rectifier bridge, which is on one side connected to AC mains and on the other side to a DC link. The DC link is connected to an inverter bridge having phase outputs configured to be connected to an elevator motor. Furthermore the motor drive comprises a drive control controlling the semiconductor switches of the inverter bridge. The inverter bridge itself has upper semiconductor switches of the upper side connected to plus of the DC link and lower semiconductor switches of the lower side connected to minus of the DC link.

The upper semiconductor switches are semiconductor switches without desaturation- and/or over-current protection whereas the lower semiconductor switches comprise a desaturation- and/or over-current protection, or vice versa. The drive control comprises an earth fault control circuit which is configured to establish an earth fault test, in which each single semiconductor comprising a desaturation- and/or over-current protection is switched through, only one at a time, over a test time period whereby the earth fault control circuit is configured to enable start of the motor drive only if the earth fault test has not lead to a tripping of the desaturation- and/or over-current protection of one of the correlated semiconductor switches.

This solution presents a motor drive with an earth fault protection circuit that is able to detect motor earth fault in dynamic situation without need to add expensive upper side gate drivers with desaturation protection or shunt resistors. By adding the desaturation detection circuit only to the lower side semiconductor switches of inverter bridge the desaturation detection can be made inexpensively.

The advantages of the invention are small added cost in form of components to have earth fault protection and short circuit protection. In the invention there is no need to use expensive gate drivers with desaturation protection feature in combination with a galvanic isolation for the upper semiconductor switches of the inverter bridge. Also the use of a third current sensor on a third motor phase can be avoided and the response time of sensor is allowed to be slower, reducing the overall cost of the motor current sensing.

According to the invention, the desaturation detectors are integrated to the low-side IGBT transistors of the inverter bridge only. This detail is very cost-effective, especially because the control circuit (DSP processor) of the semiconductor switches, particularly IGBT transistors, is coupled to the negative DC busbar of the DC link, and thus no galvanic isolation (like opto-isolators) is required for the low-side semiconductor switches. It is also possible that the desaturation detectors are not separate components of the driver circuits of the low-side semiconductor switches, but the DSP processor (drive control) controlling the low-side transistors might also have a measuring input, which reads an collector-to-emitter voltage over the low-side semiconductor switches, and determines desaturation condition. This is cost-effectively obtainable because DSP processor is directly coupled to low-side semiconductor switches, without need of any galvanic isolation. Of course the collector-emitter voltage is quite high, so preferably an attenuator amplifier is required to reduce the voltage level from hundreds of volts to less than 5 volts for A/D converter measuring input of the DSP processor. This can be basically done with some kind of simple resistor network, so it is very cost-effective.

The inventive motor drive has an inverter having an inverter bridge control circuit or drive control which is advantageously referenced to dc-link minus. The inverter bridge control circuit may be separated from the drive control or be integrated with it. Therefore, the drivers of the lower semiconductor switches do not need an electrical isolation and the (upper side) drivers of the upper semiconductor switches need only a functional isolation, not a reinforced isolation. The upper side drivers for the semiconductor switches are basic drivers with no desaturation or other over current protection. Current measurement for the drive control is preferably provided with current sensors in two output phases. The current in the third phase can be calculated by the drive control in case there is no ground current flowing. At lower side switches, there is over current protection that is based on sensing the collector to emitter voltage (i.e. desaturation detection). This can be done by gate drivers with desaturation protection or by other control circuitry (e.g. DSP in-built comparator).

Before the normal elevator drive cycle starts the controller makes a special ground fault and short circuit test. The test is comprised of a specific switching sequence of the inverter bridge lower side switches. Lower side switches are controlled to on-state, one at a time, for a short pulse period e.g. few milliseconds. In case of earth fault at any of the motor outputs the desaturation detection trips and the fault can be detected. Preferably the drive control is referenced to minus of the DC link, and the lower semiconductor switches comprise the desaturation- and/or over-current protection. This solution provides the protection with the least hardware effort.

In a preferred embodiment of the invention the desaturation- and/or over-current protection of the semiconductor switches is implemented by their gate-drivers. This solution is cheap and does not involve the motor drive in the desaturation protection task.

Alternatively the desaturation- and/or over-current protection of the semiconductor switches may be implemented by the drive control, so that all relevant parameters can be set and monitored in connection with the drive control.

In a preferred embodiment of the invention the input of the rectifier bridge comprises contactors controlled in response to a tripping of the desaturation- and/or over-current protection of a semiconductor switch and/or in response to a current sensor signal. Thus, the motor drive can effectively disconnected from AC mains to prevent the start of operation. On the other hand, in some other embodiments the inventive motor drive may be also implemented without mechanical contactors.

In a preferred embodiment of the invention, the upper semiconductor switches are semiconductor switches without desaturation- and/or over-current protection whereas the lower semiconductor switches comprise a desaturation- and/or over-current protection. This solution is very cost-effective and easy to implement.

Preferably, the test time period is between 1 and 20 microseconds, which time period is chosen short enough that any earth fault will during the test period not lead to a deterioration of the corresponding semiconductor switch. Thus, with the choice of a test period which is short enough to detect the earth fault but to avoid the deletion of the corresponding semiconductor the test is very effective.

In this connection it is to be mentioned that normally an motor drive has three phases so that the earth fault test is terminated if all three lower or upper semiconductors having the desaturation and/or over-current protection are switched through over the test time period.

In another aspect of the invention for protecting against phase-to-phase short circuits the motor drive comprises a rectifier bridge, which is connected to a DC link, which is connected to an inverter bridge having phase outputs configured to be connected to an elevator motor. The motor drive also comprises a drive control controlling the semiconductor switches of the inverter bridge. The inverter bridge has upper semiconductor switches of the upper inverter side connected to plus of the DC link and lower semiconductor switches of the lower inverter side connected to minus of the DC link. The semiconductor switches of the inverter bridge are controlled by a drive control, which comprises a phase-to-phase short circuit control circuit which is configured to establish a phase-to-phase short circuit test, and which motor drive comprises current sensors in at least two phase outputs of the inverter bridge and/or in series with all semiconductor switches of the inverter bridge, in which phase-to-phase short circuit test the phase-to-phase short circuit control circuit which is configured perform following steps:

one semiconductor switch of one phase of the upper or lower side is controlled into a conductive state for a certain time period, and during said certain time period a semiconductor of the different side (lower or upper) and of a different phase of the inverter bridge is controlled into a conductive state for a short pulse period which is preferably shorter than the certain time period, whereby the certain time period at least partially overlaps with the short pulse period.

The phase-to-phase short circuit control circuit comprises a comparator to compare the increase of the sensor signal with at least one threshold value, the phase-to-phase short circuit control circuit is configured to control a switching element to disable at least the inverter bridge of the motor drive.

With this solution an effective phase-to-phase short circuit detection is realized with low costs.

Preferably, the switching element is a contactor of the motor drive and/or the semiconductor switches of the inverter bridge.

Preferably, the certain time period is between 10 and 30 ms, which is long enough to check the two semiconductor switches of the other bridge side and of the other phases. The short pulse period is set between 10 and 100 μs to evaluate the current signal increase and short enough to prevent damaging of the semiconductor switch.

Preferably the threshold value for the increase of the current signal is the threshold value U*dt/L, with U being the DC link voltage and L being the motor inductance. In a motor with a DC link voltage between 560V and 650V, and motor inductance of 2 mH, this value is about 28 A. Thus, a preferred range for this threshold value di is between 20 and 35 A, preferably between 25 and 30 A. This value allows a clear differentiation between the normal increase of the current signal and a phase-to-phase short circuit condition.

Preferably, the semiconductor switches are IGBT—or MOSFET transistors, which are reliable in this kind of motor drive.

The invention also relates to a method for driving an elevator motor under use of an motor drive comprising a rectifier bridge, which rectifier bridge is connected to a DC link, which is connected to an inverter bridge having phase outputs to be connected to the elevator motor, as well as a drive control controlling the semiconductor switches of the inverter bridge. The inverter bridge has upper semiconductor switches of the upper side connected to plus of the DC link and lower semiconductor switches of the lower side connected to minus of the DC link, whereby the upper semiconductor switches are semiconductor switches without desaturation- and/or over-current protection whereas the lower semiconductor switches comprise a desaturation- and/or over-current protection or vice versa. Before putting the elevator motor into operation, preferably after installation of maintenance of the elevator, an earth fault test is performed wherein each single lower semiconductors comprising a desaturation- and/or over-current protection, only one at a time, is switched through for a test time period, whereby the earth fault control circuit enables start of the motor drive only if the earth fault test has not lead to a tripping of the desaturation- and/or over-current protection of any of these semiconductors. With regard to the features and advantages of the invention it is referred to the above description of the inventive motor drive. This method provides an economic earth fault test.

The invention relates also to a method using an motor drive comprising a rectifier bridge, which rectifier bridge is connected to an DC link, which is connected to an inverter bridge having phase outputs to be connected to an elevator motor, as well as a drive control controlling the semiconductor switches of the inverter bridge. The inverter bridge has for each phase an upper semiconductor switch of the upper side connected to plus of the DC link and for each phase a lower semiconductor switches of the lower side connected to minus of the DC link, as well as current sensors in at least two phase outputs of the inverter bridge and/or in series with all semiconductor switches.

This method provides a test sequence for verifying a phase-to phase short circuit, in which test sequence following sequence of steps is performed before the elevator motor is enabled to operate:
  one semiconductor of the upper or lower side and of one phase is controlled into a conductive state for a certain time period, and
  during said certain time period a semiconductor of the different side (lower or upper) and of a different phase is controlled into a conductive state for a short pulse period as so generate a very narrow pulse,
  the sensor signal of at least one current sensor is evaluated on its increase rate, whereby
  the increase rate is compared with at least one threshold value to initiate safety measures to prevent the motor being started, if the threshold value is exceeded.

Phase to phase short circuit detection is achieved by this inventive test sequence. Thus, for example, one upper semiconductor switch is controlled to conductive state over the certain time period and then a lower semiconductor switch of a different phase is controlled to on-state over the short pulse period to see if the current increase in winding is of natural ramping nature or very rapid increase. Natural slow current increase is caused by the motor stator impedance while rapid increase would be diagnosed as short between phases. If no fault is detected then the controlled semiconductor switches are changed to another phase. Example of gate drive sequence for both tests is presented in FIG. 3. If fault is detected then the current is interrupted with lower side switch as it is easier to realize soft a turn off (slow gate capacitance discharge) there.

Preferably, the certain time period is set the certain time period is between 10 and 30 ms. Preferably, the short pulse period is set between 10 and 100 μs. Preferably the threshold value is between 20 and 35 A.

In an advantageous embodiment of the invention the test sequence is repeated with all possible combinations of upper and lower semiconductors of a different phase before the elevator motor is enabled to operate. By this measure it is ensured that no phase-to-phase short circuit between any phase exists at start of operation of the motor.

In a preferred embodiment of the invention, the semiconductor switches are IGBT transistors. These transistors are very reliable in connection with the inventive motor drive or frequency converter and are adapted together with the corresponding desaturation- and/or over-current protection to perform the fast and reliable earth fault test initiated by the earth fault control circuit.

Preferably, this earth fault test initiated by the earth fault control circuit is only started when the elevator is switched on a hardware base. Usually, earth faults are generated during installation or maintenance of an elevator. Thus, the check on earth faults has only to be made before the elevator is taken into use either after the first installation or after maintenance.

Preferably, the drive control is referenced to the pole of the DC link at which the semiconductor switches comprising the desaturation- and/or over-current protection is located. If these are the lower semiconductors, then the drive control is referenced to minus of the DC link. If the upper semiconductor switches comprise the desaturation- and/or over-current protection, then the drive control is referenced to plus of the DC link. Preferably it is referenced to the minus pole of the DC link.

If the phases of the elevator motor are isolated against each other, the switching through of the windings between two phases will always lead to a slow increase of the current signal because of the magnetic impedance of the motor windings. A steep increase will only happen if there is a short-circuit between any motor windings. Thus, the method allows an effective test of a phase-to-phase short-circuit whereby any damage of the motor windings or semiconductor switches are avoided. As via the short pulse control of one of the semiconductors it is ensured that the resulting current is not able to burn the semiconductor switch or motor coil. It has to be mentioned that this phase-to-phase short-circuit test can also be provided independent of the earth fault test according to the other method. Of course, the phase-to-phase short-circuit is repeated with all possible combinations of upper and lower semiconductors. Via this measure, a phase-to-phase short-circuit between any phases of the elevator motor can be checked.

Of course, the above-mentioned methods can be performed in any embodiment of an motor drive according to the above description. Vice versa, any embodiment of an inventive motor drive is able to perform any of the above mentioned methods, so that the corresponding method and apparatus features of method- and apparatus claims can be combined any may support each other. It is clear for the skilled person that the above-mentioned embodiments may be combined with each other arbitrarily.

For the inventive earth fault detection to work properly, advantageously the input side of the rectifier should be connected directly to AC mains, or, if an additional isolation transformer is used between AC mains and the rectifier bridge, the secondary winding of the transformer should be grounded or otherwise referenced to earth.

Following terms in this application are used as a synonym: frequency converter—motor drive; drive control—motor controller; driver of the upper semiconductors—high side driver; driver of the lower semiconductors—low side driver; DSP processor—drive control; ground fault—earth fault;

It is clear for the skilled person that parts of the motor drive, particularly the drive control, may be integrated in the motor drive or may be placed at a different location, for example in connection with the elevator control. The drivers of the semiconductors may be integrated in or separated from the drive control.

The invention is hereinafter described by the aid of an exemplary embodiment in connection with the drawings. In these drawings FIG. 1 shows a circuit diagram of an motor drive comprising an earth fault detection circuit, FIG. 2A an alternative inverter part of the motor drive according to FIG. 1 wherein an IGBT desaturation protection of the semiconductor switches is realized with gate drivers, FIG. 2B the inverter part of the motor drive according to FIG. 1 wherein the IGBT desaturation protection is realized with the drive controller, and FIG. 3 the pulse patterns of a ground fault detection as well as to a phase-to-phase short-circuit detection.

FIG. 1 shows an inventive motor drive or frequency converter 10 with three phases UVW corresponding to a conventional public three-phase AC supply network.

The frequency converter 10 comprises a rectifier bridge 12 formed by controlled semiconductor switches 14a-14f. On the output side of the rectifier bridge 12 a DC link 16 with a plus pole 18 as well as a minus pole 20 between which a smoothing capacitor 22 is connected. The DC link 16 is connected with an inverter bridge 24 comprising an upper bridge side 26 connected to the plus pole 18 of the DC link as well as a lower bridge side 28 connected to the minus pole 20 of the DC link 16. On the upper bridge side 26, there are three semiconductor switches 30a, 30b and 30c, one for each pole, and also the lower bridge side 28 comprises three lower semiconductor switches 30d, 30e, 30f, one for each phase. Optionally, with each of the semiconductor switches 30a-30f of the inverter bridge 24, a current sensor 32a-f is connected in series. Furthermore, optionally in the three phase outputs 34, 36, 38 for the connection of the inverter bridge 24 with an elevator motor, phase output current sensors 40a-c are located. The lower semiconductors 30d-30f of the inverter bridge 24 have a desaturation- or over-current control realized by a drive control 42, which control at least the semiconductors 30a-30f of the inverter bridge 24 or via a separate gate drivers of each of the lower semiconductor switches 30d-30f. The input of the rectifier bridge 12 comprises contactors 44 which are controlled by the drive control 42. Between the contactors 44 and the rectifier bridge 12 a smoothing circuit 43 is connected.

The inventive frequency converter 10 works as follows. Before the frequency converter is put into operation, the drive control 42 performs an earth fault test as well as a phase-to-phase short-circuit test.

First, the drive control 42 closes the contactors 44 so that the rectifier bridge 12 is connected to AC mains u, v, w. Before the motor drive 10 is allowed to start, i.e. to operate the elevator motor as to rotate, it performs first the earth fault test. On this behalf, the lower semiconductors 30d, 30e, 30f are—only one at a time—switched through for a test time period which is short enough not to damage the corresponding semiconductor if an earth fault of the corresponding phase should be present. The earth fault will immediately lead to a tripping of the desaturation- or over-current protection of the corresponding semiconductor. Thus, the test time period has to be long enough to allow the tripping of the desaturation protection and on the other hand short enough to avoid a damage of the semiconductor switch.

Only after each of the lower semiconductor switches has been controlled into its conductive state for the test time period and none of the desaturation- and/or over-current protections has tripped the motor drive 10 is allowed to operate the elevator motor.

Here it is to be emphasized that for the inventive earth fault detection to work properly, advantageously the input side of the rectifier should be connected directly to AC mains or, if an additional isolation transformer is used between AC mains and rectifier bridge, the secondary winding of the transformer should be grounded or otherwise referenced to earth.

Additionally or alternatively, before the operation of the motor drive 10, it can be checked whether there is any phase-to-phase short-circuit between the phases 34, 36, 38 of the inverter 24 or elevator motor. On this behalf, a semiconductor switch 30a-30c of the upper bridge side 26 is controlled to switch through for a certain time period whereas a lower semiconductor switch 30d-30f of a different phase is controlled to switch through for a short pulse period, whereby the certain time period and the short pulse period at least partially overlap. This overlap leads to an increase of the current signal sensed by at least one of the current sensors 40a-40d in the phase outputs 34, 36, 38 or one of the current sensors 32a-32f connected in series with the semiconductor switches 30a-30f of the inverter bridge 24. If the increase of the current measured by the current sensor 32a-f, 40a-c is too steep, i.e. exceeds a set threshold value, the contactors 44 are opened so that the motor drive 10 is disabled to operate. This test is performed with each combination of an upper semiconductor switch 30a-c of the upper bridge side 26 in combination with any other lower semiconductor switch 30d-30f of a different phase of the lower bridge side 28. If the phase-to-phase short-circuit test does not reveal any short-circuit between the output phases 40a, 40b, 40c, the motor drive 10 is put into normal operation.

In FIG. 1 there is an active line bridge used, but all the principles discussed in this document apply also to an inverter realized with a passive diode bridge input topology.

FIG. 2A shows the inverter bridge 24 of the frequency converter 10 of FIG. 1 in a first alternative embodiment where the desaturation control of the lower semiconductor switches is realized with gate drivers 46a-46c. In contrast thereto in the second embodiment of FIG. 2B, the desaturation- or over-current protection of the lower semiconductor switches 30d-30f is realized by the drive control 42.

FIG. 3 shows on the left side the pulse patterns for the earth fault test where each of the lower semiconductors 30d-30f of the inverter 24 is switched through over a test time period t. On the right side the upper semiconductor 30a of the first phase is switched through over a certain time period c1 whereafter the lower semiconductors 30e and 30f of the second and third phase are switched through over a short pulse period p. Via this test it is ensured that there is no short circuit between the first and the second as well as the first and the third phase. Thereafter the upper semiconductor 30b of the second phase is switched through over a second certain time period c2, which is shorter than the first certain time period c1 of the first semiconductor switch 30a as here only the lower semiconductor switch 30f of the third phase is to be checked via a short pulse period p. Thereafter it is ensured that no short circuit between any of the three phases is present.

The test is performed via monitoring the current signals of the current sensors 32a-f and/or 40a-c. When the increase of the current signal exceeds a set threshold value a short circuit is deemed present and the contactor relay 44 is tripped.

The invention is not restricted to the above-mentioned embodiments but can be varied within the scope of the appended patent claims. Thus the rectifier bridge 12 can also be built conventionally with diodes instead of semiconductor switches.

LIST OF REFERENCE NUMBERS 10 motor drive—frequency converter
12 rectifier bridge
14 semiconductors of the rectifier bridge
16 DC link
18 plus pole of the DC link
20 minus pole of the DC link
22 smoothing capacitor
24 inverter bridge
26 upper bridge side
28 lower bridge side
30a-f semiconductor switches of the inverter bridge—MOSFETs—IGBTs
32a-f current sensors connected in series with the semiconductor switches
34 first phase output of the inverter bridge
36 second phase output of the inverter bridge
38 third phase output of the inverter bridge
40a,b,c current sensors of the phase outputs
42 drive control
43 smoothing circuit
44 contactors
46a,b,c gate drivers of the lower semiconductor switches of the inverter
t test time period
c1,c2 certain time period
p short pulse period

The invention claimed is:

1. A motor drive for a passenger conveyor, the motor drive comprising:
   a rectifier bridge, said rectifier bridge being connected to an DC link, said DC link being connected to an inverter bridge having phase outputs configured to be connected to an elevator motor; and
   a drive control controlling the semiconductor switches of the inverter bridge,
   wherein the inverter bridge has upper semiconductor switches of the upper side connected to plus of the DC link and lower semiconductor switches of the lower side connected to minus of the DC link,
   wherein the upper semiconductor switches are semiconductor switches without desaturation protection and/or over-current protection, whereas the lower semiconductor switches comprise a desaturation protection and/or over-current protection, or vice versa,
   wherein the drive control comprises an earth fault control circuit configured to establish an earth fault test, and
   wherein the earth fault control circuit is configured to perform an earth fault test, in which each single semiconductor switch comprising a desaturation protection and/or over-current protection is switched through, only one at a time, over a test time period whereby the earth fault control circuit is configured to enable start of the motor drive only if the earth fault test has not lead to a tripping of the desaturation protection and/or over-current protection of one of the lower semiconductor switches.

2. The motor drive according to claim 1, wherein the test time period is between 1 and 20 microseconds.

3. The motor drive according to claim 1, in which the drive control is referenced to minus of the DC link, and the lower semiconductor switches comprise the desaturation protection.

4. The motor drive according to claim 1, wherein the desaturation protection of the semiconductor switches is implemented by their gate-drivers.

5. The motor drive according to claim 1, wherein the desaturation protection of the semiconductor switches is implemented by the drive control.

6. The motor drive according to claim 1, wherein control signal paths from the drive control to control poles of the lower side semiconductor switches are implemented without galvanic isolation.

7. The motor drive according to claim 1, wherein the input of the rectifier bridge comprises contactors or a contactor relay controlled in response to a tripping of the desaturation- and/or over-current protection of a semiconductor switch and/or in response to a current sensor signal.

8. The motor drive according to claim 1, wherein the semiconductor switches are IGBT or MOSFET transistors.

9. The motor drive according to claim 2, in which the drive control is referenced to minus of the DC link, and the lower semiconductor switches comprise the desaturation protection.

10. The motor drive according to claim 2, wherein the desaturation protection of the semiconductor switches is implemented by their gate-drivers.

11. The motor drive according to claim 2, wherein the desaturation protection of the semiconductor switches is implemented by the drive control.

12. The motor drive according to claim 2, wherein control signal paths from the drive control to control poles of the lower side semiconductor switches are implemented without galvanic isolation.

13. The motor drive according to claim 3, wherein the desaturation protection of the semiconductor switches is implemented by their gate-drivers.

14. The motor drive according to claim 3, wherein the desaturation protection of the semiconductor switches is implemented by the drive control.

15. The motor drive according to claim 3, wherein control signal paths from the drive control to control poles of the lower side semiconductor switches are implemented without galvanic isolation.

16. The motor drive according to claim 4, wherein the desaturation protection of the semiconductor switches is implemented by the drive control.

17. A motor drive according to claim 4, wherein control signal paths from the drive control to control poles of the lower side semiconductor switches are implemented without galvanic isolation.

18. A method for driving an elevator motor, using a motor drive, the motor drive comprising:

a rectifier bridge, the rectifier bridge being connected to a DC link, the DC link being connected to an inverter bridge having phase outputs to be connected to the elevator motor; and a drive control controlling the semiconductor switches of the inverter bridge, the drive control comprising an earth fault control circuit configured to establish an earth fault test, wherein the inverter bridge has upper semiconductor switches of the upper side connected to plus of the DC link and lower semiconductor switches of the lower side connected to minus of the DC link, wherein the upper semiconductor switches are semiconductor switches without desaturation- and/or over-current protection, whereas the lower semiconductor switches comprise a desaturation- and/or over-current protection or vice versa, said method comprising:

performing, before the start of the elevator motor, an earth fault test with the earth fault control circuit, wherein each single semiconductor switch comprising a desaturation- and/or over-current protection, only one at a time, is switched through for a test time period, whereby the earth fault control circuit enables start of the motor drive only if the earth fault test has not lead to a tripping of the desaturation- and/or over-current protection of any of these semiconductor switches.

19. A motor drive configured to perform the method according to 18.

* * * * *